(12) United States Patent
Minagawa (10) Patent No.: US 8,411,180 B2
(45) Date of Patent: Apr. 2, 2013

(54) SOLID-STATE IMAGING DEVICE, CAMERA SYSTEM, SOLID-STATE IMAGING DEVICE READING METHOD AND PROGRAM

(75) Inventor: Yusuke Minagawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 358 days.

(21) Appl. No.: 12/923,916

(22) Filed: Oct. 14, 2010

(65) Prior Publication Data

US 2011/0102646 A1 May 5, 2011

(30) Foreign Application Priority Data

Nov. 2, 2009 (JP) ................. 2009-252446

(51) Int. Cl.
*H04N 3/14* (2006.01)
*H04N 9/64* (2006.01)
(52) U.S. Cl. .................... 348/294; 348/242
(58) Field of Classification Search .......... 348/294, 348/242
See application file for complete search history.

(56) References Cited

U.S. PATENT DOCUMENTS

2008/0204469 A1 8/2008 Jaspers
2010/0039539 A1* 2/2010 Kinoshita ............... 348/242

FOREIGN PATENT DOCUMENTS

JP 2004-038694 2/2004
JP 2008-541598 T 11/2008

* cited by examiner

*Primary Examiner* — James Hannett
(74) *Attorney, Agent, or Firm* — Rader, Fishman & Grauer PLLC (57) ABSTRACT

A solid-state imaging device includes: a pixel section formed by pixels having a photoelectric conversion function arranged in a matrix; a pixel driving section driving the operation of the pixels to allow a readout to be performed according to a readout mode; a readout circuit reading out signals from the pixels and outputting the signals as image data in a raw data format; and a logic section performing scaling and phase correction in preparation for a resolution conversion process on a signal output from the readout circuit. The logic section includes a resize portion performing a scaling process on the signal from the readout circuit according to a scaling factor N and a correction portion obtaining a distance Scaled_P between pixels of the same color which have been scaled from the scaling factor N, a readout factor B, and a distance P between pixels of different colors, obtaining the amount of correction to be made on a pixel to be corrected from the distance Scaled_P and the distance P, and performing phase correction according to the amount of correction.

7 Claims, 9 Drawing Sheets

ORIGINAL PIXEL ARRAY

PIXEL ARRAY IN BAYER FORMAT

SOLID-STATE IMAGING DEVICE, CAMERA SYSTEM, SOLID-STATE IMAGING DEVICE READING METHOD AND PROGRAM

BACKGROUND OF THE INVENTION

1. Field of the Invention

The present invention relates to a solid-state imaging device, a camera system, a method and a program for reading data from a solid-state imaging device.

2. Description of the Related Art

Some of image sensors such as CMOS (complementary metal oxide semiconductor) image sensors (CIS) have a resolution converting function acting primarily in the direction of scaling down for the purpose of achieving an increased frame rate through a reduction in the amount of image data to be output.

Resolution conversion is carried out using two types of approaches, i.e., thin-out and summation (or averaging which may alternatively be called binning) performed when reading pixels or performed in the analog domain and scaling which is performed in the digital domain.

"Thin-out" is a process of reading out pixels of a sensor intermittently or with some rows and columns of pixels skipped instead of reading out all pixels of the sensor, and "summation" is a process of reading out signals of a plurality of pixels simultaneously.

In addition to "thin-out" and "summation", processes of reading out pixels of an image sensor with some of the pixels skipped instead of reading out all pixels include processes such as "slicing" that is a process of reading out part of pixels.

Figure 1:
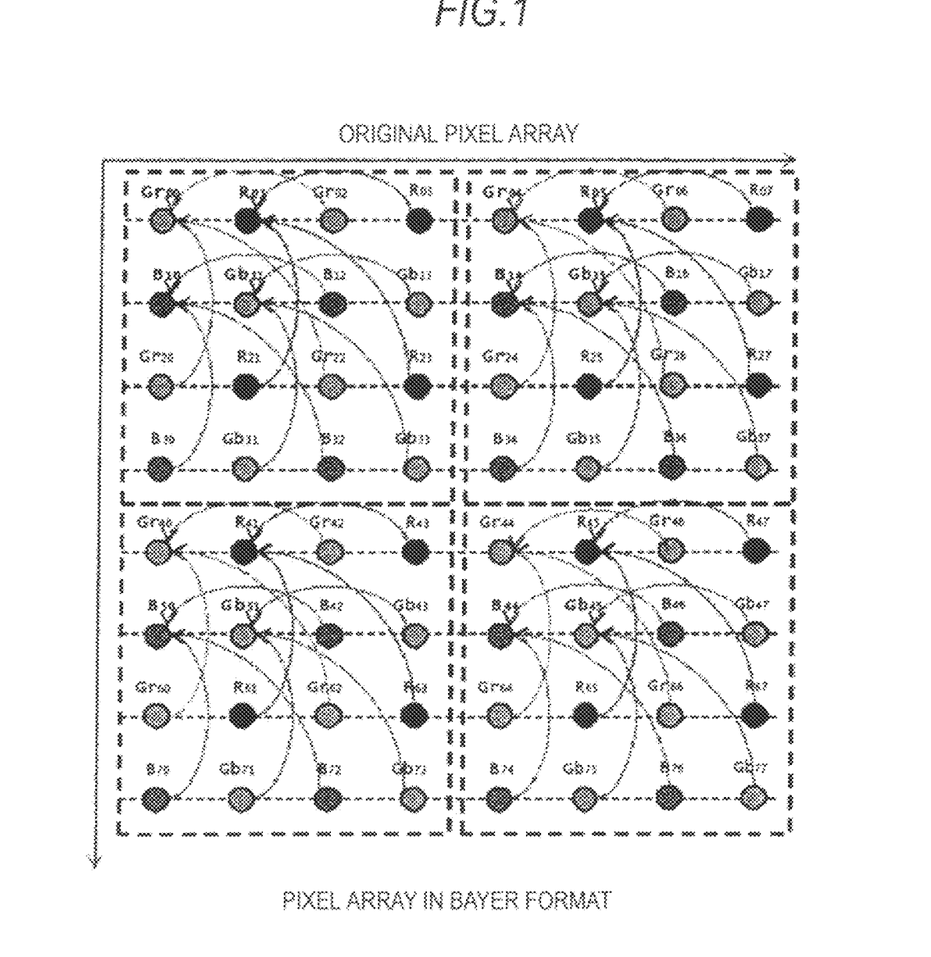
FIG. 1 is an illustration showing a pixel array in the Bayer format.

FIG. 1 is an illustration showing a pixel array in the Bayer format.

Figure 2:
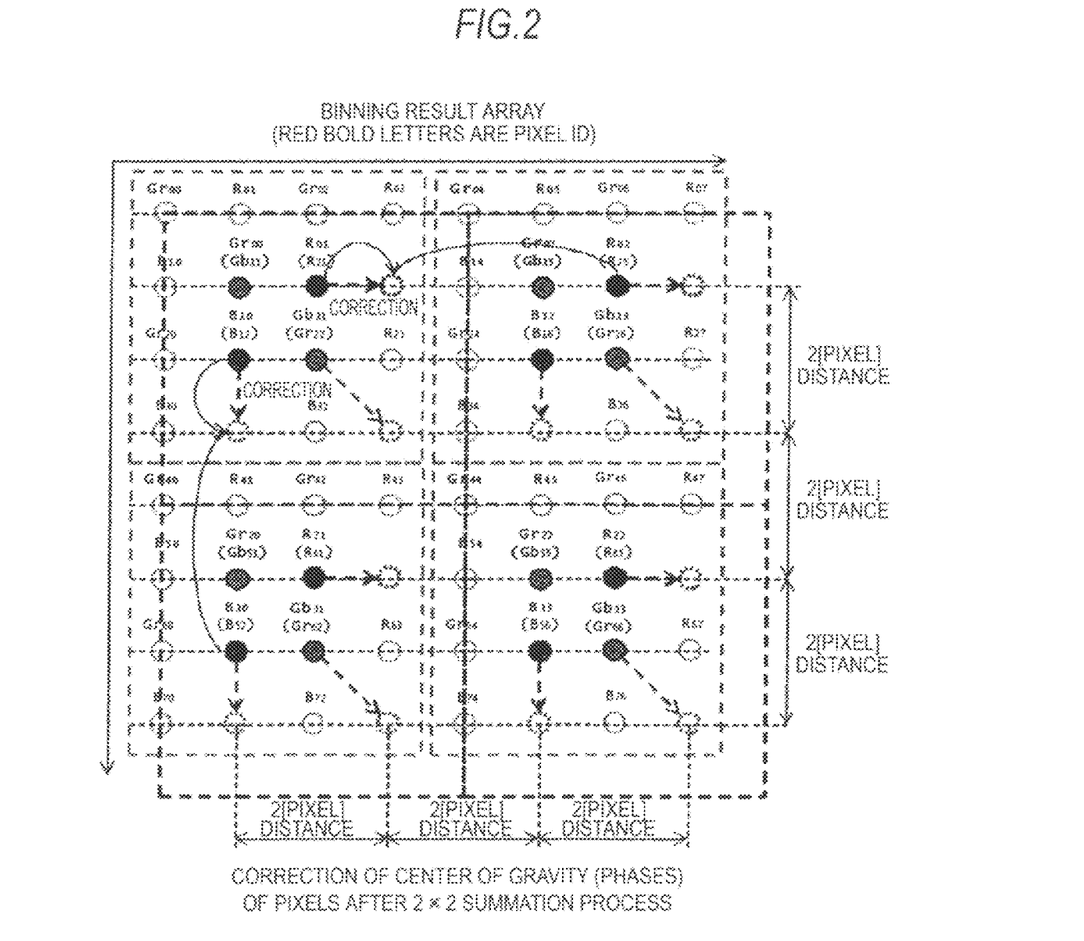
FIG. 2 is an illustration for explaining correction of the gravity of gravity (phases) of pixels which have been subjected to a 2×2 conversion process.

FIG. 2 is an illustration for explaining correction of the gravity (phase) of pixels which have been subjected to a 2×2 conversion process.

When the Bayer format is used as the output format of an image sensor, as shown in FIG. 1, the phase distances between color elements must be equal to each other.

Since the Bayer format is formed by pixel components in four colors R, Gr, Gb, and B, the above-described resolution conversion processes must be performed between pixels of the same color.

As a result of the conversion, distances between pixels of the same color are changed while distances between pixels of different colors are kept unchanged. It is therefore necessary to correct the phases of pixels to be output (the gravity of the pixels) as shown in FIG. 2.

Various proposals have been made on techniques to be used for pixel phase correction and color conversion processes (for example, see JP-A-2004-38694 and JP-A-2008-541598 (Patent Documents 1 and 2)).

SUMMARY OF THE INVENTION

Correction of pixel phases is normally carried out in association with each conversion process.

For example, according to the technique disclosed in Patent Document 1, color conversion is carried out after the execution of gamma correction.

According to the technique, when plural types of image conversion processes are to be performed, a color correction circuit must be provided in association with each of the processes, which is disadvantageous in that the technique necessitates a circuit of a large scale and results in increased power consumption.

Further, most color conversion processes involve color correction based on luminance like the technique disclosed in Patent Document 2, and there is substantially no color conversion technique based on the four elements of the Bayer format, in practice.

Under the circumstance, it is desirable to provide a solid-state imaging device which can perform resolution conversion steps collectively and which can therefore be implemented with its circuit scale kept small and increase in power consumption suppressed. It is also desirable to provide a camera system having such a solid-state imaging device and a method and a program for reading out data from such a solid-state imaging device.

According to an embodiment of the invention, there is provided a solid-state imaging device including a pixel section formed by a plurality of pixels having a photoelectric conversion function arranged in the form of a matrix, a pixel driving section driving the operation of the pixels to allow a readout to be performed according to a readout mode, a readout circuit reading out signals from the pixels and outputting the signals as image data in a raw data format, and a logic section performing scaling and phase correction in preparation for a resolution conversion process on a signal output from the readout circuit. The logic section includes a resize portion performing a scaling process on the signal output from the readout circuit according to a scaling factor N (N is a value greater than 0) and a correction portion obtaining a distance Scaled_P between pixels of the same color which have been scaled from the scaling factor N, a readout factor B, and a distance P between adjoining pixels of different colors, obtaining the amount of correction to be made on a pixel to be corrected from the distance Scaled_P between pixels of the same color and the distance P between adjoining pixels of different colors, and performing phase correction according to the amount of correction.

According to another embodiment of the invention, there is provided a camera system including a solid-state imaging device and an optical system forming an image of an object on the solid-state imaging device. The solid-state imaging device includes a pixel section formed by a plurality of pixels having a photoelectric conversion function arranged in the form of a matrix, a pixel driving section driving the operation of the pixels to allow a readout to be performed according to a readout mode, a readout circuit reading out signals from the pixels and outputting the signals as image data in a raw data format, and a logic section performing scaling and phase correction in preparation for a resolution conversion process on a signal output from the readout circuit. The logic section includes a resize portion performing a scaling process on the signal output from the readout circuit according to a scaling factor N (N is a value greater than 0) and a correction portion obtaining a distance Scaled_P between pixels of the same color which have been scaled from the scaling factor N, a readout factor B, and a distance P between adjoining pixels of different colors, obtaining the amount of correction to be made on a pixel to be corrected from the distance Scaled_P between pixels of the same color and the distance P between adjoining pixels of different colors, and performing phase correction according to the amount of correction.

According to still another embodiment of the invention, there is provided a method of reading data from a solid-state imaging device, including the steps of driving the operation of pixels of a pixel section formed by a plurality of pixels having a photoelectric conversion function arranged in the form of a matrix to allow a readout to be performed according to a readout mode, reading out signals from the pixels and outputting the signals as image data in a raw data format, and performing scaling and phase correction in preparation for a resolution conversion process on a signal output at the readout step. The scaling and correction step includes the steps of performing a scaling process on the signal output at the readout step according to a scaling factor N (N is a value greater than 0), obtaining a distance Scaled_P between pixels of the same color which have been scaled from the scaling factor N, a readout factor B, and a distance P between adjoining pixels of different colors, obtaining the amount of correction to be made on a pixel to be corrected from the distance Scaled_P between pixels of the same color and the distance P between adjoining pixels of different colors, and performing phase correction according to the amount of correction.

According to yet another embodiment of the invention, there is provided a program causing a computer to execute processes for reading data from a solid-state imaging device, the processes including a pixel driving process for driving the operation of pixels of a pixel section formed by a plurality of pixels having a photoelectric conversion function arranged in the form of a matrix to allow a readout to be performed according to a readout mode, a readout process for reading out signals from the pixels and outputting the signals as image data in a raw data format, and a scaling and correction process for performing scaling and phase correction in preparation for a resolution conversion process on a signal output at the readout process. The scaling and correction process includes a resize process for scaling the signal output at the readout process according to a scaling factor (N is a value greater than 0), a process for obtaining a distance Scaled_P between scaled pixels of the same color from the scaling factor N, a readout factor B, and a distance P between adjoining pixels of different colors, a process for obtaining the amount of correction to be made on a pixel to be corrected from the distance Scaled_P between pixels of the same color and the distance P between adjoining pixels of different colors, and a correction process for performing phase correction according to the amount of correction.

According to the embodiments of the invention, resolution conversion steps can be collectively performed, and the embodiment can therefore be implemented with a small circuit scale while suppressing any increase in power consumption.

DESCRIPTION OF PREFERRED EMBODIMENTS

An embodiment of the invention will now be described with reference to the drawings. The following items will be described in the order listed.

1. Exemplary General Configuration of CMOS Image Sensor (Solid-State Imaging Device)
2. Correction of Phases of Output Pixels (Center of Gravity of Pixels)
3. Exemplary Configuration of Camera System <1. Exemplary General Configuration of CMOS Image Sensor (Solid-State Imaging Device)>

Figure 3:
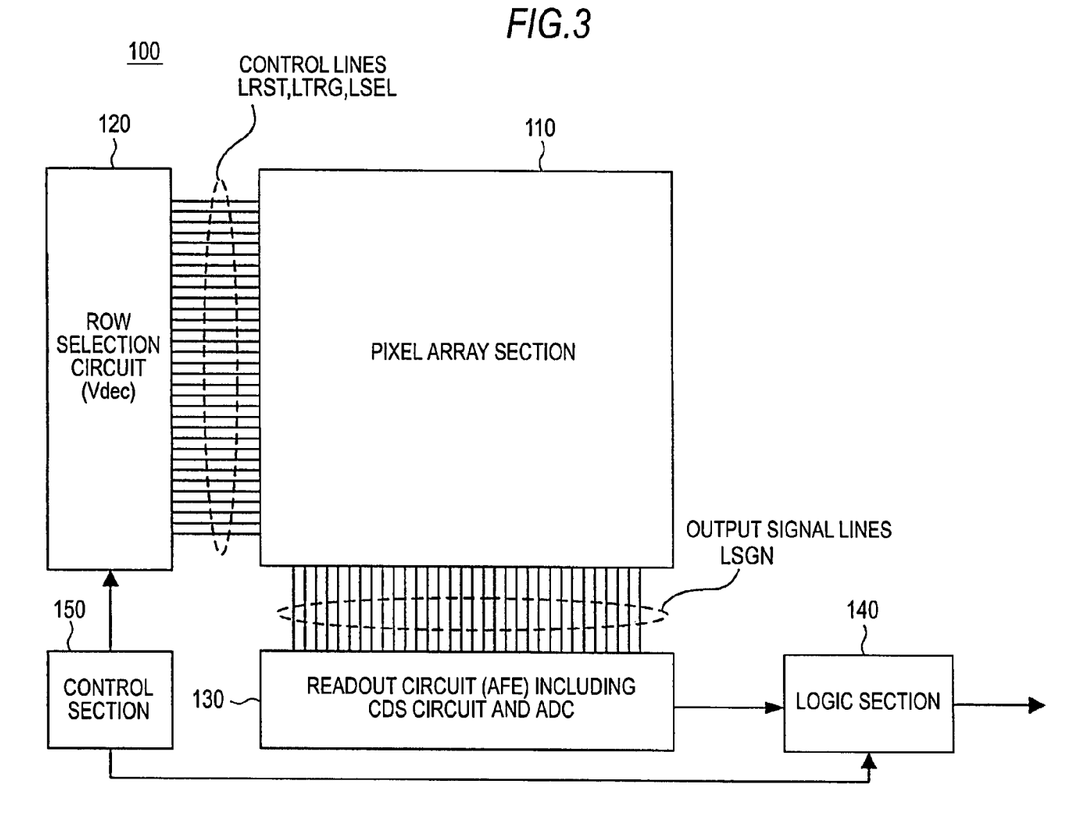
FIG. 3 is an illustration showing an exemplary configuration of a CMOS image sensor (solid-state imaging device) according to an embodiment of the invention.

FIG. 3 is an illustration showing an exemplary configuration of a CMOS image sensor (solid-state imaging device) according to an embodiment of the invention.

A CMOS image sensor 100 includes a pixel array section 110, a row selection circuit (Vdec) 120 serving as a pixel driving section, a readout circuit (AFE) 130, a logic section 140, and a control section 150.

The pixel array section 110 includes a plurality of pixel circuits 110A arranged in the form of a two-dimensional array (matrix) having M rows and N columns.

Figure 4:
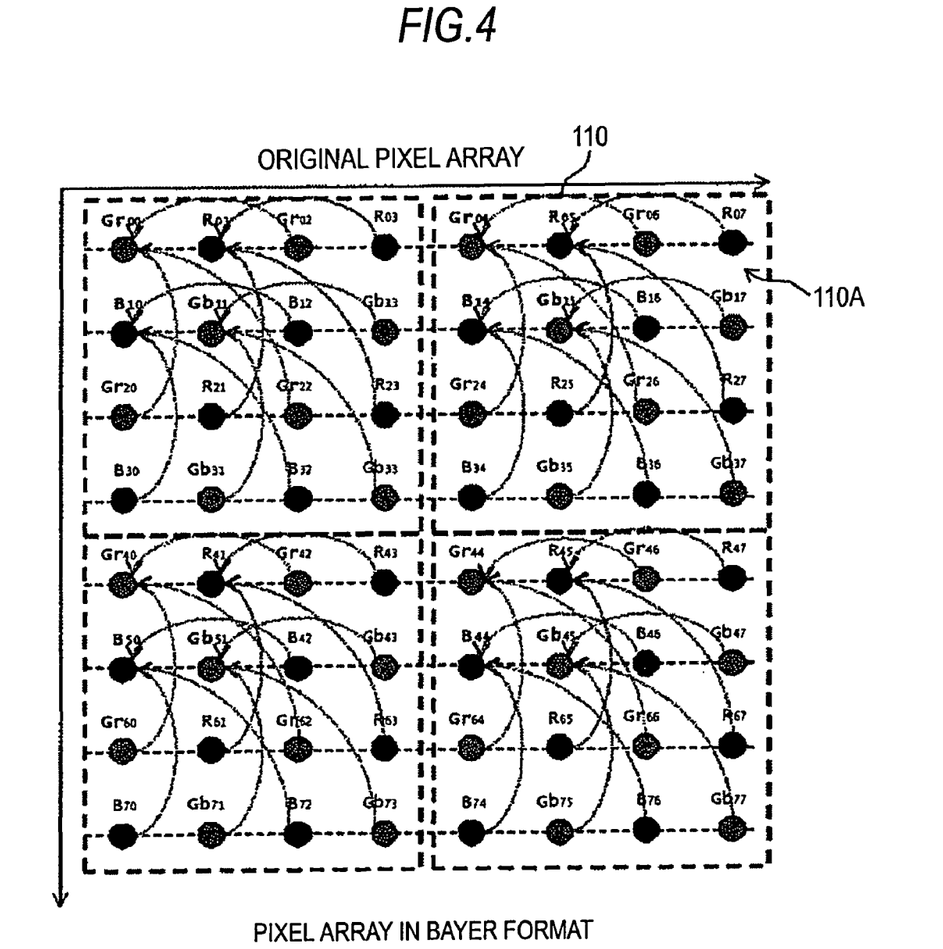
FIG. 4 is an illustration showing a pixel array in the Bayer format according to the embodiment.

FIG. 4 is an illustration showing a pixel array in the Bayer format according to the present embodiment.

In the Bayer format, pixel circuits are arranged such that phase distances between color elements are equal to each other as shown in FIG. 4.

The Bayer format is formed by pixel components in four colors, i.e., R, Gr, Gb, and B. Therefore, when resolution conversion is carried out in the direction of scaling down or scaling up, the process must be performed between pixels of the same color.

In this case, the conversion process changes distances between pixels of the same color while distances between pixels of different colors are kept unchanged. It is therefore required to correct the phases of pixels thus output (the center of gravity of the pixels).

In the present embodiment, phase correction is carried out in a system for converting resolution by performing two steps, i.e., a pixel readout step (performed in the analog domain) typically involving thin-out and summation (averaging) and a scaling step (performed in the digital domain) at which a universal conversion factor can be set.

Specifically, in the system of the present embodiment, phase correction is carried out at collectively after all of the resolution converting steps are finished to utilize circuit resources effectively and to achieve low power consumption.

Figure 5:
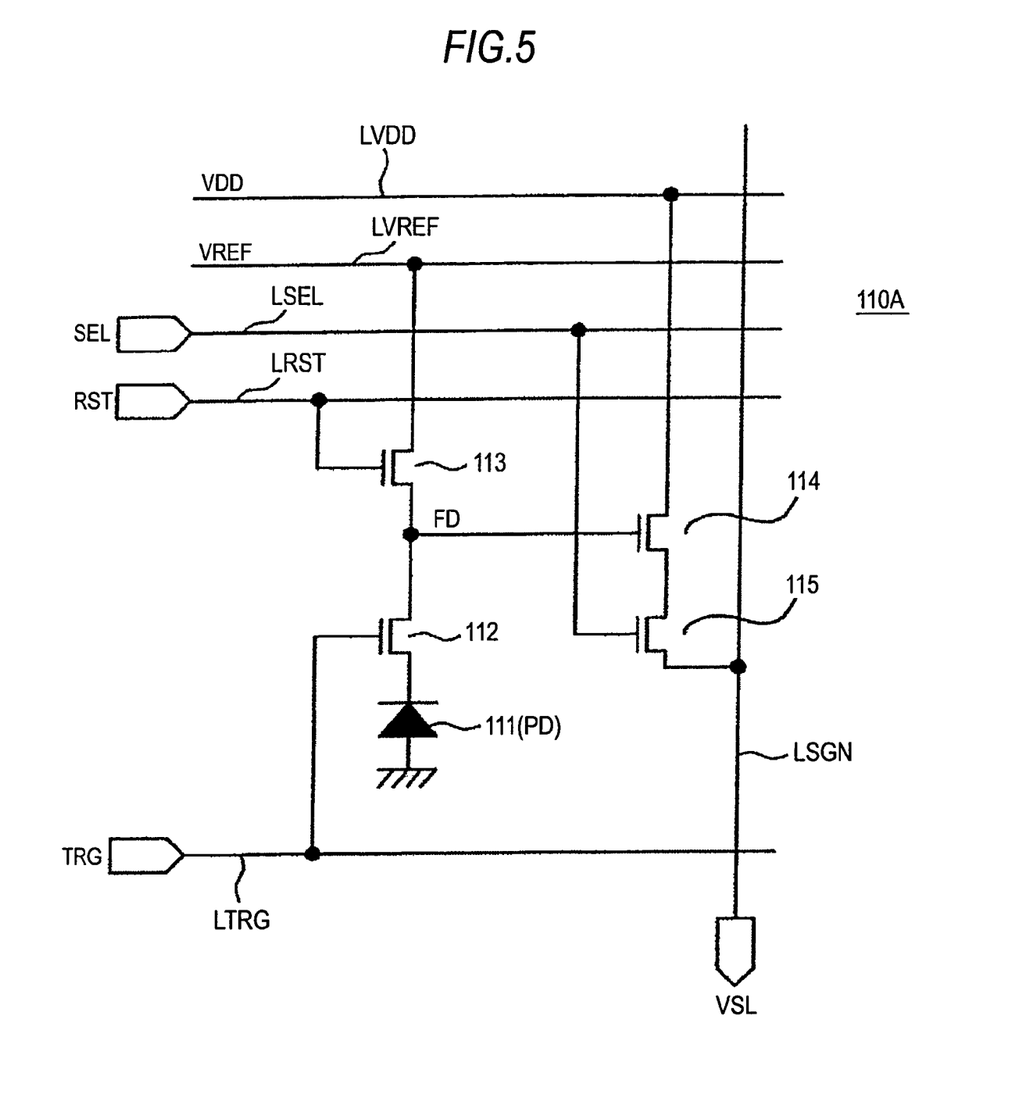
FIG. 5 is a diagram showing an example of a pixel of the CMOS image sensor according to the embodiment which is formed by four transistors.

FIG. 4 is an illustration showing examples of pixels of the CMOS image sensor of the present embodiment, each pixel including four transistors.

A pixel circuit 110A includes a photoelectric conversion element 111 which may be, for example, a photodiode (PD) and which may therefore be simply referred to as "PD".

The pixel circuit 110A includes four transistors serving as active elements associated with the single photoelectric conversion element 111, i.e., a transfer transistor 112, a reset transistor 113, an amplification transistor 114, and a selection transistor 115.

The photoelectric conversion element 111 photo-electrically converts light incident thereon into electric charge (electrons in this case) in an amount according to the amount of the incident light.

The transfer transistor 112 is connected between the photoelectric conversion element 111 and floating diffusion FD serving as an output node. A transfer signal TRG, which is a control signal, is supplied to the gate of the transistor (transfer gate) through a transfer control line LTRG.

Thus, the transfer transistor 112 transfers the electrons obtained by the photoelectric conversion at the photoelectric conversion element 111 to the floating diffusion FD.

The reset transistor 113 is connected between a power supply line LVREF and the floating diffusion FD, and a reset signal RST, which is a control signal, is supplied to the gate of the transistor through a reset control line LRST.

Thus, the reset transistor 113 resets the potential at the floating diffusion FD to the potential at the power supply line LVREF.

The gate of the amplification transistor 114 is connected to the floating diffusion FD. The amplification transistor 114 is connected to an output signal line LSGN through the selection transistor 115 to form a source follower in combination with a constant current source provided outside the pixel section.

A selection signal SEL, which is a control signal associated with an address signal, is supplied to the gate of the selection transistor 115 through a selection control line LSEL to turn the selection transistor 115 on.

When the selection transistor 115 is turned on, the amplification transistor 114 amplifies the potential at the floating diffusion FD and outputs a voltage in accordance with the potential at the floating diffusion to the output signal line LSGN. A voltage output from each pixel as thus described is output to the readout circuit 130.

The above-described operations are simultaneously performed at the pixels of each row because the gates of the transfer transistors 112, the reset transistors 113, and the selection transistors 115 are connected such that the pixels are read out on a row-by-row basis.

The reset control lines LRST, the transfer control lines LTRG, and the selection control line LSEL provided in the pixel array section 110 are laid such that one set of such control lines serve each row of the pixel array.

M each reset control lines LRST, transfer control lines LTRG, and selection control lines LSEL are provided.

The reset control lines LRST, the transfer control lines LTRG, and the selection control lines LSEL are driven by the row selection circuit 120.

The row selection circuit 120 controls operations of pixels disposed on an arbitrary row of the pixel array section 110. The row selection circuit 120 controls the pixels through the control lines LSEL, LRST, and LTRG.

The row selection circuit 120 drives or controls the pixels through the control lines LSEL, LRST, and LTRG under control exercised by the control section 150 according to a readout mode such as an all pixel readout mode, thin-out read mode, or summation readout mode.

The row selection circuit 120 controls the imaging operation under control exercised by the control section 150 by exposing the pixels with the shuttering mode switched between the rolling shutter for exposing pixels on a row-by-row basis and the global shutter method for exposing all pixels simultaneously in parallel.

The readout circuit 130 receives data of rows of pixels read out under the control exercised by the row selection circuit 120 through the output signal lines LSGN and supplies the data to the logic section 140 as raw data.

The readout circuit 130 includes a CDS circuit and ADCs (analog-digital converters).

The logic section 140 has the function of scaling a signal output from the readout circuit 130 and correcting the phase of the signal in preparation for a subsequent resolution conversion process.

Figure 6:
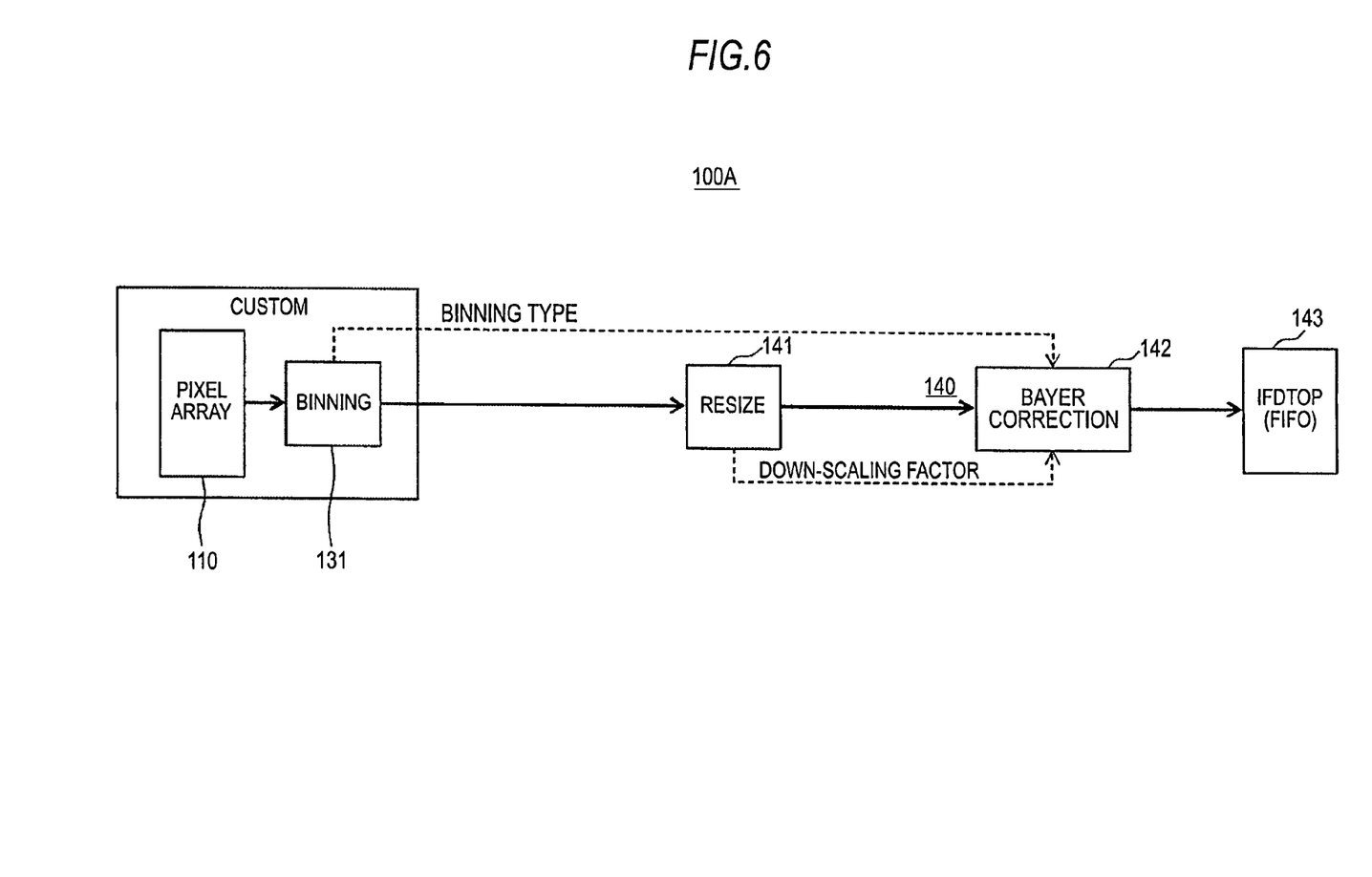
FIG. 6 is a diagram schematically showing a color conversion (correction) system according to the embodiment.

FIG. 6 is a diagram schematically showing the color conversion (correction) system of the present embodiment.

As shown in FIG. 6, the logic section 140 includes a resize portion 141, a correction portion (which may alternatively be referred to as "Bayer correction portion") 142, and an output portion 143.

The resize portion 141 performs a process of scaling a signal output from the readout circuit 130 according to a scaling factor.

The correction portion 142 has the function of obtaining a distance Scaled_P between pixels of the same color which have been scaled from a scaling factor N (N is greater than 0), a readout factor B, and a distance P between adjoining pixels of different colors.

$$Scaled\_P = xBNP$$

where x represents a parameter which is determined by the pixel array of interest. In the case of a Bayer array as that used in the present embodiment, the value of the parameter x is 2.

The correction portion 142 obtains the amount of correction to be made on a pixel of interest from the distance Scaled_P between pixels of the same color and the distance P between adjoining pixels of different colors. The correction portion performs phase correction based on the amount of correction.

The correction portion 142 obtains a distance D to a correction point as the amount of correction to be made on a pixel of interest according to the following expression.

$$D = (Scaled\_P/x) - P$$

As described above, x=2 in the present embodiment.

In the present embodiment, the readout factor B is a binning factor which represents the number of pixels to be subjected to thin-out or summation in the case of resolution conversion in the direction of scaling down, and the readout factor B is 1 in the case of resolution conversion in the direction of scaling up.

The control section 150 controls the CMOS image sensor 100 as a whole.

The control section 150 supplies the scaling factor N and the readout factor B, which depend on the readout mode adopted, to the row selection circuit 120 and the logic section 140.

The CMOS image sensor 100 of the present embodiment may be regarded as having a system for handling such an image format that correction must be carried out on outputs obtained by a process performed on the image format when the process has linearity or reversibility with respect to an input image and includes plurality of steps.

It is assumed that the system satisfies the following conditions.

(1) The plurality of steps is basically involved in resolution conversion.

(2) The steps are constituted by summation/averaging of pixels and thinning out of pixels.

Such a system also satisfies the following conditions.

(3) The correction of output commonly takes place at the plurality of steps.

(4) The image format is a raw data format which may typically be the Bayer format.

The logic section 140 of the CMOS image sensor 100 of the present embodiment aligns the phases of outputs to allow a thin-out and binning process and resolution conversion to be performed in parallel when pixels are read out.

As a result, circuit resources can be efficiently laid out, and low power consumption can be achieved.

A phase correction process (color conversion process) according to the embodiment will now be specifically described.

<2. Correction of the Phases of Output Pixels (the Center of Gravity of Pixels)>

Figure 7:
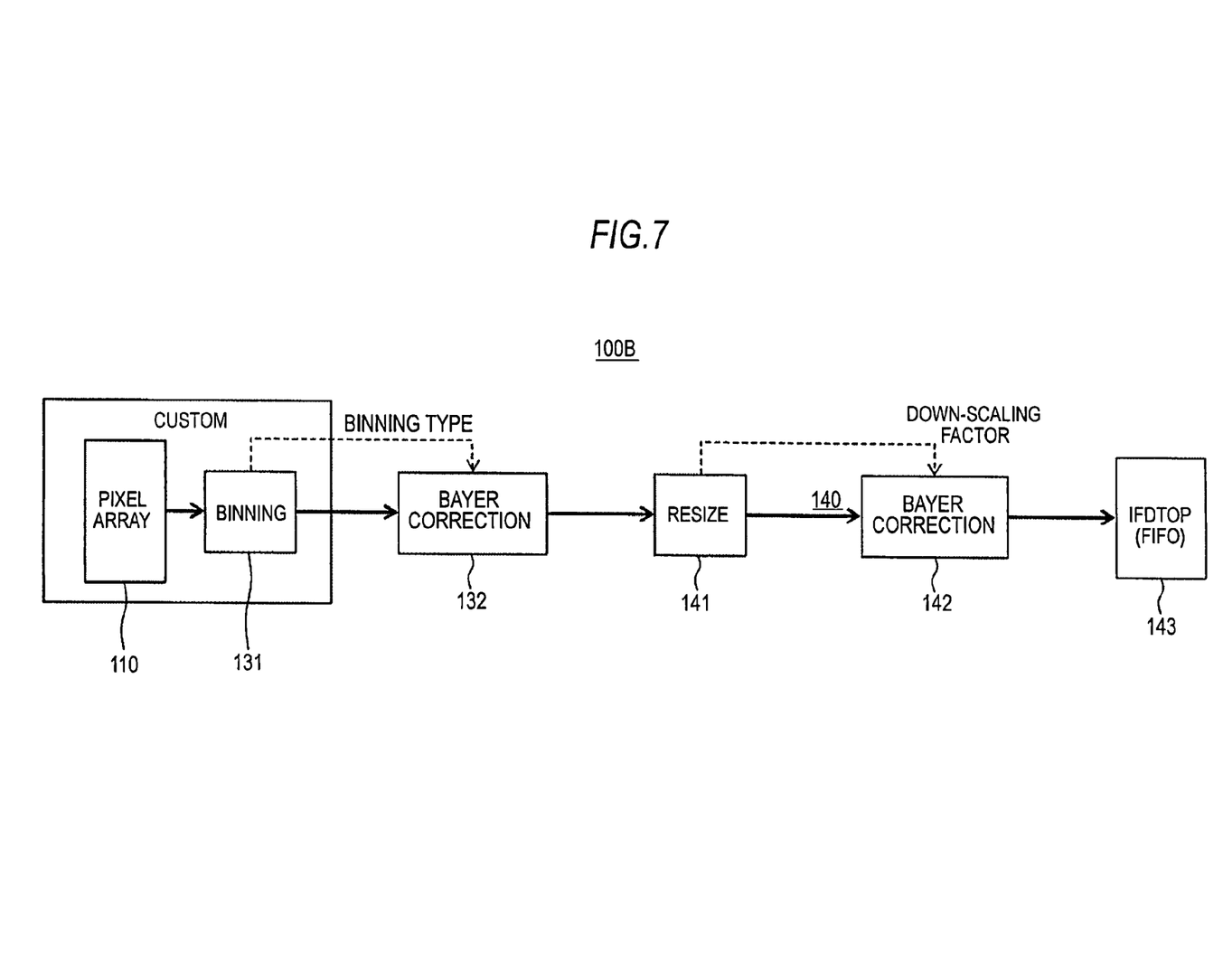
FIG. 7 is a diagram schematically showing a common color conversion (correction) system.

FIG. 7 is a diagram schematically showing a common color conversion (correction) system.

For easier understanding, parts identical between FIGS. 6 and 7 in terms of functions are indicated by like reference numerals.

A system 100A in FIG. 6 is advantageous when used for a resolution conversion process of an image sensor including two steps, i.e., a pixel readout step (performed in the analog domain) which typically involves thin-out and summation (averaging) and a scaling step (performed in the digital domain) at which a universal conversion factor can be set.

A common color conversion (correction) system 100B shown in FIG. 7 will be first described, and the color conversion (correction) system 100A according to the embodiment will be thereafter described.

The common color conversion (correction) system 100B includes a pixel array section 110, a binning portion 131, a Bayer correction portion 132, a resize portion 141, and another Bayer correction portion 142.

In the system 100B, binning type information is supplied from the binning portion 131 to the Bayer correction portion 142.

The binning type information includes information on the number of pixels to be subjected to summation.

At the Bayer correction portion 132, a correction process is performed at a first resolution conversion step.

The output of the Bayer correction portion 132 is supplied to the resize portion 141. A scaling process is performed at the resize portion 141, and information on the process is supplied to the Bayer correction portion 142. At this time, down scaling factor (DSF) information is supplied from the resize portion 141 to the Bayer correction portion 142.

At the Bayer correction portion 142, so-called Bayer correction (correction of the center of gravity of pixels) is performed.

The color conversion (correction) system 100A of the present embodiment includes a pixel array portion 110, a binning portion 131, a resize portion 141, and a Bayer correction portion 142.

In the system 100A, data obtained by a binning process is supplied from the binning portion 131 to the resize portion 141.

In the system 100A, binning type information is provided to the Bayer correction portion 142 which is the final stage of the system.

The scaling process is performed at the resize portion 141, and information on the process is supplied to the Bayer correction portion 142. At this time, the down scaling factor (DSF) information is supplied from the resize portion 141 to the Bayer correction portion 142.

At the Bayer correction portion 142, so-called Bayer correction (correction of the center of gravity of pixels) is carried out.

As thus described, in the common color conversion (correction) system 100B, phase correction as shown in FIG. 2 is carried out at each resolution conversion step.

On the contrary, in the color conversion (correction) system 100A of the present embodiment, phase correction is carried out at a time after all resolution conversion steps are finished instead of carrying out the phase correction at each resolution conversion step.

Such an approach contributes to effective utilization of circuit resources and suppression of power consumption.

Principles of the system 100A will now be described.

Thin-out and summation may be regarded as conversion of resolution into a certain magnification in terms of the number of pixels.

Figure 8:
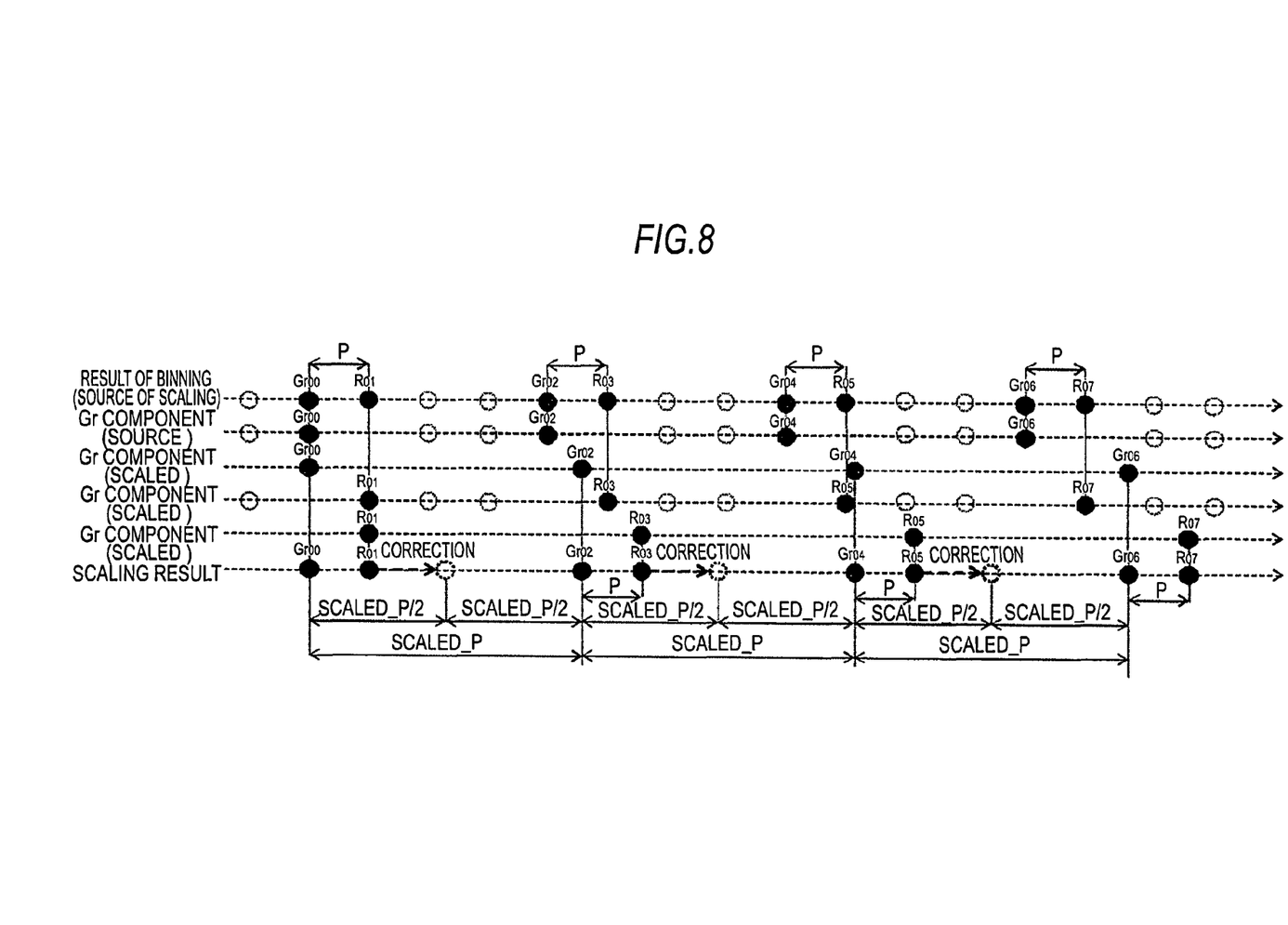
FIG. 8 is a graph showing an example of two-pixel summation and scaling simultaneously executed in the CMOS image sensor according to the embodiment.

FIG. 8 is a graph showing an example of simultaneous execution of two-pixel summation and scaling.

Referring to FIG. 8, a scaling factor (which is a down scaling factor (DSF)) is defined as having a value of 16/N where N represents 16 or a greater natural number, and a binning factor (the number of pixels to be subjected to summation) is represented by B.

A distance scaled_P between pixels of the same color which have been scaled can be represented by the following expression where P represents a distance P between adjoining pixels of different colors.

$$\text{scaled\_P} = \frac{2BNP}{16}$$

Let us now focus on the amount of correction to be made on a pixel to be corrected (an R pixel in FIG. 8).

In the case of a pixel $R_{O1}$, the distance D to a point of correction is given by the following expression.

$$D = \frac{\text{scaled\_P}}{2} - P = \left(\frac{BN}{16} - 1\right)P$$

Distances from pixels $R_{O1}$ and $R_{O3}$ to the position of an R pixel obtained after the correction can be defined by the following expression when it is assumed that the distances are represented as weights for rendering a pixel using linear interpolation.

$$R_{O1} : R_{O3} = \left(\frac{\text{scaled\_P}}{2} + P\right) : \left(\frac{\text{scaled\_P}}{2} - P\right)$$

The position of the point of correction is uniquely determined by the distance between Gr pixels which sandwich the R pixel obtained by the correction.

The distance scaled_P between the pixels (distance between pixels of the same color) has linearity with respect to both of the binning factor B and the scaling factor N.

It can be concluded from the above description that correction of the center of gravity of pixels associated with the two steps of resolution conversion can be collectively carried out at a single point of correction (the technique shown in FIG. 6).

The value ($R_{cor}$) of the pixel obtained by the correction is given by the following expression. In the following expression, "m" represents 1 or a greater natural number.

$$R_{cor} = \left(\frac{\text{scaled\_P}}{2} + P\right) R[2m - 1] + \left(\frac{\text{scaled\_P}}{2} - P\right) R[2m + 1]$$

The above definition of the distance scaled_P can be substituted in Expression 6 to change it into the following expression.

$$R_{cor} = \left(\frac{1}{2} - \frac{8}{BN}\right)R[2m+1] + \left(\frac{1}{2} + \frac{8}{BN}\right)R[2m-1]$$

Linearity is maintained because the factors B and N are independent of each other.

Thus, the technique proposed in the present embodiment has been proved to be appropriate.

As described above, color conversion (a resolution conversion process) can be collectively performed at a single point. Circuit resources can therefore be disposed efficiently.

Further, since the process requires a small amount of circuit resources, power consumption can be suppressed.

The invention may be embodied in various CMOS image sensors with no particular limitation. For example, the invention may be embodied in a CMOS image sensor incorporating a column-parallel type analog-digital converter (ADC).

A solid-state imaging device providing advantages as thus described may be used as an imaging device of a digital camera or video camera.

<3. Exemplary Configuration of Camera System>

Figure 9:
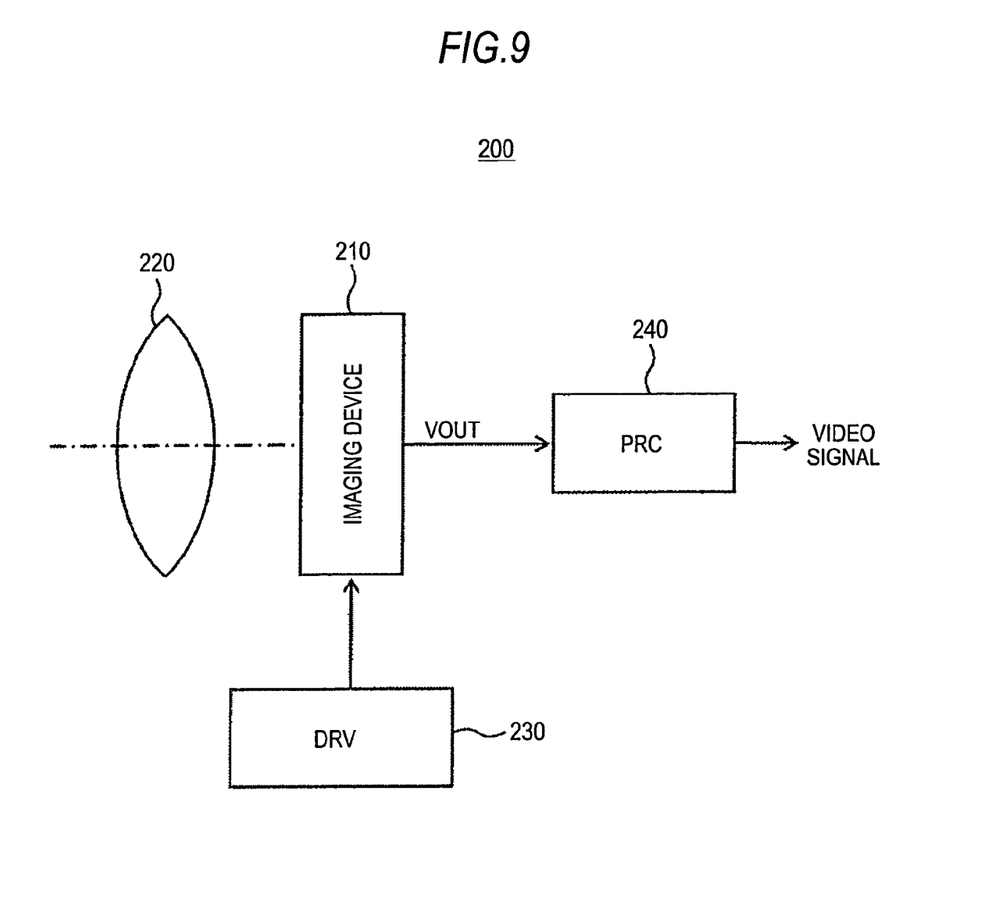
FIG. 9 is a diagram showing an exemplary configuration of a camera system employing a solid-state imaging device according to the embodiment of the invention.

FIG. 9 is a diagram showing an exemplary configuration of a camera system employing a solid-state imaging device according to the embodiment of the invention.

As shown in FIG. 9, a camera system 200 includes an imaging device 210 which may be a CMOS image sensor (solid-state imaging device) 100 according to the embodiment.

The camera system 200 also includes an optical system for guiding incident light to a pixel region of the imaging device 210 (for forming an image of an object), e.g., a lens 220 forming an image of the incident light (image light) on an imaging surface.

The camera system 200 includes a driving circuit (DRV) 230 driving the imaging device 210 and a signal processing circuit (PRC) 240 processing signals output from the imaging device 210.

The driving circuit 230 includes a timing generator (not shown) for generating various timing signals including a start pulse and a clock pulse for driving circuits of the imaging device 210, and the driving circuit drives the imaging device 210 using predetermined timing signals.

The signal processing circuit 240 performs predetermined signal processing on signals output from the imaging device 210.

Image signals which have been processed by the signal processing circuit 240 are recorded in a recording medium such as a memory. A hard copy of image information recorded in the recording medium is made by a printer or the like. An image signal processed by the signal processing circuit 240 is displayed as a motion picture by a monitor which may be a liquid crystal display.

As apparent from the above description, an imaging apparatus such as a digital camera consuming low power and having high accuracy can be provided by incorporating a CMOS image sensor (solid-state imaging device) 100 as an imaging device 210 in the apparatus.

The method described above in detail may be implemented as a program for carrying out the above-described steps, and the program may be configured such that it is executed by a computer such as a CPU.

Such a program may be stored in a recording medium such as a semiconductor memory, a magnetic disc, an optical disc, or a floppy (registered trademark) disc, and the program may be accessed and executed by a computer in which the recording medium is set.

The present application contains subject matter related to that disclosed in Japanese Priority Patent Application JP 2009-252446 filed in the Japan Patent Office on Nov. 2, 2009, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A solid-state imaging device comprising:
   a pixel section formed by a plurality of pixels having a photoelectric conversion function arranged in the form of a matrix;
   a pixel driving section driving the operation of the pixels to allow a readout to be performed according to a readout mode;
   a readout circuit reading out signals from the pixels and outputting the signals as image data in a raw data format; and
   a logic section performing scaling and phase correction in preparation for a resolution conversion process on a signal output from the readout circuit, wherein the logic section includes
   a resize portion performing a scaling process on the signal output from the readout circuit according to a scaling factor N (N is a value greater than 0) and
   a correction portion obtaining a distance Scaled_P between pixels of the same color which have been scaled from the scaling factor N, a readout factor B, and a distance P between adjoining pixels of different colors, obtaining the amount of correction to be made on a pixel to be corrected from the distance Scaled_P between pixels of the same color and the distance P between adjoining pixels of different colors, and performing phase correction according to the amount of correction.

2. A solid-state imaging device according to claim 1, wherein the correction portion obtains the distance Scaled_P between the pixels of the same color which have been scaled according to an expression $$Scaled\_P = xBNP$$

where x represents a parameter determined by the arrangement of the pixels.

3. A solid-state imaging device according to claim 1 or 2, wherein the correction portion obtains a distance D to a point of correction as the amount of correction to be made on the pixel to be corrected according to an expression $$D = (Scaled\_P/x) - P.$$

4. A solid-state imaging device according to claim 1 or 2, wherein the readout factor B is a binning factor which represents the number of pixels to be subjected to thin-out or summation in the case of resolution conversion in the direction of scaling down and which is 1 in the case of resolution conversion in the direction of scaling up.

5. A camera system comprising:
   a solid-state imaging device; and
   an optical system forming an image of an object on the solid-state imaging device, wherein
   the solid-state imaging device includes
   a pixel section formed by a plurality of pixels having a photoelectric conversion function arranged in the form of a matrix, a pixel driving section driving the operation of the pixels to allow a readout to be performed according to a readout mode, a readout circuit reading out signals from the pixels and outputting the signals as image data in a raw data format, and a logic section performing scaling and phase correction in preparation for a resolution conversion process on a signal output from the readout circuit, the logic section including a resize portion performing a scaling process on the signal output from the readout circuit according to a scaling factor N (N is a value greater than 0) and a correction portion obtaining a distance Scaled_P between pixels of the same color which have been scaled from the scaling factor N, a readout factor B, and a distance P between adjoining pixels of different colors, obtaining the amount of correction to be made on a pixel to be corrected from the distance Scaled_P between pixels of the same color and the distance P between adjoining pixels of different colors, and performing phase correction according to the amount of correction.

6. A method of reading data from a solid-state imaging device, comprising the steps of:

driving the operation of pixels of a pixel section formed by a plurality of pixels having a photoelectric conversion function arranged in the form of a matrix to allow a readout to be performed according to a readout mode;

reading out signals from the pixels and outputting the signals as image data in a raw data format; and performing scaling and phase correction in preparation for a resolution conversion process on a signal output at the readout step, wherein the scaling and correction step includes the steps of performing a scaling process on the signal output at the readout step according to a scaling factor N (N is a value greater than 0), obtaining a distance Scaled_P between scaled pixels of the same color from the scaling factor N, a readout factor B, and a distance P between adjoining pixels of different colors, obtaining the amount of correction to be made on a pixel to be corrected from the distance Scaled_P between pixels of the same color and the distance P between adjoining pixels of different colors, and performing phase correction according to the amount of correction.

7. A non-transitory computer readable medium embodying a program causing a computer to execute processes for reading data from a solid-state imaging device, the processes including:

a pixel driving process for driving the operation of pixels of a pixel section formed by a plurality of pixels having a photoelectric conversion function arranged in the form of a matrix to allow a readout to be performed according to a readout mode;

a readout process for reading signals from the pixels and outputting the signals as image data in a raw data format; and a scaling and correction process for performing scaling and phase correction in preparation for a resolution conversion process on a signal output at the readout process, wherein the scaling and correction process includes a resize process for scaling the signal output at the readout process according to a scaling factor (N is a value greater than 0), a process for obtaining a distance Scaled_P between scaled pixels of the same color from the scaling factor N, a readout factor B, and a distance P between adjoining pixels of different colors, a process for obtaining the amount of correction to be made on a pixel to be corrected from the distance Scaled_P between pixels of the same color and the distance P between adjoining pixels of different colors, and a correction process for performing phase correction according to the amount of correction.

* * * * *